(12) United States Patent
Yamawaki

(10) Patent No.: US 7,848,194 B2
(45) Date of Patent: Dec. 7, 2010

(54) DEVICE AND METHOD FOR WRITING DATA

(75) Inventor: Masashi Yamawaki, Kasugai (JP)

(73) Assignee: Fujitsu Semiconductor Limited, Yokohama (JP)

( * ) Notice: Subject to any disclaimer, the term of this patent is extended or adjusted under 35 U.S.C. 154(b) by 588 days.

(21) Appl. No.: 11/882,256

(22) Filed: Jul. 31, 2007

(65) Prior Publication Data
US 2008/0080353 A1    Apr. 3, 2008

(30) Foreign Application Priority Data
Sep. 28, 2006    (JP)    ............................. 2006-265235

(51) Int. Cl.
*G11B 7/00* (2006.01)
(52) U.S. Cl. ............. 369/47.48; 369/59.25; 369/124.07
(58) Field of Classification Search ................ 369/47.1, 369/59.11, 59.25, 59.22, 47.15, 47.19, 47.2, 369/47.46, 47.48, 53.31, 53.34, 53.36, 124.07
See application file for complete search history.

(56) References Cited

U.S. PATENT DOCUMENTS 7,009,532 B2 *    3/2006    Ushiyama et al. ............. 341/59

FOREIGN PATENT DOCUMENTS

| JP | 63-229625 | 9/1988 |
|---|---|---|
| JP | 8-10489 B2 | 1/1996 |

\* cited by examiner

*Primary Examiner*—Nabil Z Hindi
(74) *Attorney, Agent, or Firm*—Fujitsu Patent Center

(57) ABSTRACT

A data writing device for preventing a phase-change optical disc from deteriorating due to repeated writing and for preventing the rewritable number of times of the disc from decreasing. The device writes data including synchronization frames to the disc. Each synchronization frame includes a primary or secondary synchronization signal. A comparator compares a first accumulated DSV for specifying the data including the primary synchronization signal for the synchronization frame with a second accumulated DSV for specifying the recording data including the secondary synchronization signal for the synchronization frame and generates a first selection signal based on the comparison. An inverter randomly inverts the first selection signal to generate a second selection signal. A selection circuit receives the primary and secondary synchronization signals and outputs the primary or secondary synchronization signal in response to the second selection signal.

16 Claims, 9 Drawing Sheets

Fig.3 (Prior Art)
PrimarySYNC1/SecondarySYNC2
SY0=0001001001000100 0000000000010001/0001001000000100 0000000000010001
SY1=0000010000000100 0000000000010001/0000010001000100 0000000000010001
SY2=0001000000000100 0000000000010001/0001000001000100 0000000000010001
SY3=0000100000000100 0000000000010001/0000100001000100 0000000000010001
SY4=0010000000000100 0000000000010001/0010000001000100 0000000000010001
SY5=0010001001000100 0000000000010001/0010001000000100 0000000000010001
SY6=0010010010000100 0000000000010001/0010000010000100 0000000000010001
SY7=0010010001000100 0000000000010001/0010010000000100 0000000000010001
Fig.4A (Prior Art)
<SY0>
Primary SYNC1 0001001001000100 0000000000010001
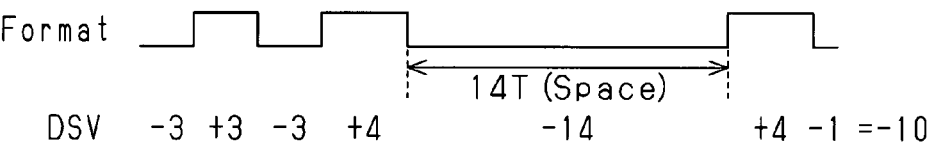
Fig.4B (Prior Art)
<SY0>
Secondary SYNC2 0001001000000100 0000000000010001
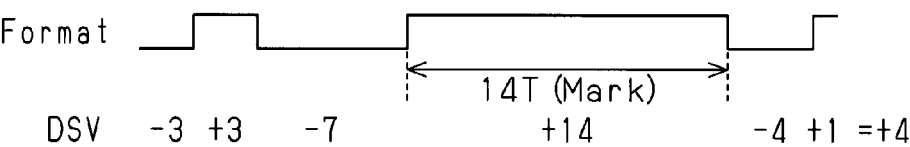
Fig.5 (Prior Art)
```
0001001001000100000 000 0000010001
0001001001000100000000 000 10001
         000100100100 000 000000000010001
                      ←→
```

DEVICE AND METHOD FOR WRITING DATA

CROSS-REFERENCE TO RELATED APPLICATIONS

This application is based upon and claims the benefit of priority from the prior Japanese Patent Application No. 2006-265235, filed on Sep. 28, 2006, the entire contents of which are incorporated herein by reference.

BACKGROUND OF THE INVENTION

It is related to a device and method for writing data. Phase-change optical discs enabling repetitive recording, such as a DVD–RW and a DVD+RW, have become widespread over these years. The same data may be repeatedly written at the same position on a phase-change optical disc. However, when different data is subsequently written to the disc at the same data, the different data may not be correctly recorded on the disc. Accordingly, such defective recording must be reduced in phase-change optical discs.

Digital data is conventionally written to a phase-change optical disc by irradiating recording layers of the disc that are in a crystalline state with an intense laser beam. Then, the recording layers that have reached a dissolution temperature are rapidly cooled and changed to an amorphous state. An amorphous recording layer is normally referred to as a "mark", and a recording layer between marks is normally referred to as a "space", which is crystalline. Digital data is reproduced based on differences in reflectivity (light refraction index) between the crystalline portions and amorphous portions of the disc.

The writing of data to such a phase-change optical disc will now be described with reference to FIG. 1 using a DVD–RW as an example.

To write data onto a DVD–RW with a data writing device 1, the data that is to be recorded is transmitted from a host interface HOST I/F and stored in a buffer memory 5 via a controller unit 4, which is controlled by a CPU 3. A modulation circuit 50 incorporated in the controller unit 4 reads the data that is to be recorded from the buffer memory 5. The modulation circuit 50 modulates the data and provides the modulated data to a write channel unit 6 as write data WD. The modulation circuit 50 also provides a write clock signal WCLK to the write channel unit 6. In accordance with the write clock signal WCLK, the write channel unit 6 writes the write data WD to the DVD–RW with a pickup 7.

To enable high-density recording on the DVD–RW, the modulation circuit 50 in this type of data writing device 1 type modulates the data that is to be recorded by performing through eight-to-sixteen modulation in which eight bits of data are modulated to sixteen bits of data. The modulation circuit 50 further carries out a non-return to zero inverted (NRZI) technique to convert the data, which has undergone the eight-to-sixteen modulation, into modulation data MD in the NRZI format. The NRZI technique inverts the value preceding a data bit value of 1 and holds the value preceding a data bit value of 0. The modulation data MD in the NRZI format includes a mark and a space, each having a data length of 3T to 11T (where T is the length of a reference clock).

To enable synchronized detection during demodulation, the modulation circuit 50 adds two bytes of synchronization information SYNC to every ninety-one bytes of modulation data MD when generate the write data WD, as shown in FIG. 2. More specifically, the write data WD includes a plurality of synchronization frames, each of which is includes two head bytes of synchronization information SYNC and ninety-one bytes of modulation data MD. The frame (sector) structure of the write data corresponds to the physical sector of the DVD–RW.

As examples of the 2-byte synchronization information SYNC, FIG. 3 shows a plurality of (eight, for example) different types of synchronization signals SY0 to SY7 that identify frame numbers. For example, the synchronization signal SY0 is added to the head of the synchronization frame 1, and the synchronization signal SY1 is added to the head of the synchronization frame 2. Each of the synchronization signals SY0 to SY7 is either one of two synchronization signals, that is, a primary synchronization signal SYNC1 or a secondary synchronization signal SYNC2.

The primary synchronization signal SYNC1 and the secondary synchronization signal SYNC2 will now be described with reference to FIGS. 4A and 4B using the synchronization signal SY0 as an example. Each of the primary synchronization signal SYNC1 and the secondary synchronization signal SYNC2 is synchronization data in the NRZI format, and includes a mark or a space having a data length of 14T (a pattern in which fourteen consecutive clocks having the same level follow the fourteenth bit that has the value of "1"). In detail, the primary synchronization signal SYNC1 (FIG. 4A) includes an odd number of the value of "1" before the 14T appears. The secondary synchronization signal SYNC2 (FIG. 4B) includes an even number of the value of "1" before the 14T appears. When the 14T data of the primary synchronization signal SYNC1 is a space, the 14T data of the secondary synchronization signal SYNC2 is a mark. When the 14T data of the primary synchronization signal SYNC1 is a mark, the 14T data of the secondary synchronization signal SYNC2 is a space.

The modulation circuit 50 adds to the head of each frame as the synchronization information SYNC the one of the primary synchronization signal SYNC1 and the secondary synchronization signal SYNC2 with an absolute value of an accumulated digital sum value (DSV) that is closer to "0". The DSV (digital sum value) is the accumulated value of points given in correspondence with the number of bits included in each bit string. Here, a point of +1 is given to each bit in a first level state (a bit value of "1" in this example) and a point of –1 is given to each bit in a second level state (a bit value of "0" in this example) as shown in FIGS. 4A and 4B. For example, when the accumulated DSV of the data preceding the synchronization information SYNC (synchronization signal SY0) added to the modulation data is 0 and a bit value of the modulated data preceding the synchronization information SYNC is 0, if the primary synchronization signal SYNC1 in FIG. 4A is selected as the synchronization information SYNC, the accumulated DSV will be –10 (0–10). If the secondary synchronization signal SYNC2 in FIG. 4B is selected, the accumulated DSV will be 4 (0+4). In this case, the secondary synchronization signal SYNC2 of the synchronization signal SY0 is selected as the synchronization information SYNC and added to the head of the synchronization frame (for example, the synchronization frame 1).

By lowering the absolute value of the DSV, low-frequency components of the write data WD can be reduced. This simplifies a binary circuit arranged in a reproducing device and reduces jitter that would be generated by a binary error.

However, when, for example, the same data is written repeatedly with the data writing device 1, the same data is repeatedly written at the same position. When the same data is repeatedly written at the same position on a phase-change optical disc, a mark and its vicinity would deteriorate due to thermal damage or the like. Thus, when different data (e.g., a space) is recorded next on the phase-change optical disc, the write data may not be correctly written. This decreases the rewritable number of times of the phase-change optical disc.

To prevent such deterioration of a phase-change optical disc, Japanese Examined Patent Publication No. 8-10489 describes a method for randomly changing the position at which the writing of data starts. In detail, the recording start position of the write data is changed randomly within a sector (frame) so that the same data is not written at the same position. This prevents deterioration of the phase-change optical disc.

In the DVD–RW standard and DVD+RW standard, the recording start position of the write data is provided with a small margin. Thus, the recording start position of the write data is changeable only within a limited range. Even if the recording start position of the write data is randomly changed, a portion of the 14T data of the synchronization information SYNC is always written at the same position as shown in FIG. 5. Accordingly, the position at which the same data portion is repeatedly written and its vicinity would deteriorate due to thermal damaged or the like. This decreases the rewritable number of times of the phase-change optical disc.

SUMMARY OF THE INVENTION

A data writing device and a data writing method are provided that prevent repeated writing from causing deterioration of a phase-change optical disc without decreasing the rewritable number of times of the disc.

One aspect is a device for writing recording data including a plurality of synchronization frames to a phase-change optical disc. Each of the plurality of synchronization frames includes either one of a primary synchronization signal and a secondary synchronization signal. The device includes a comparator for comparing a first accumulated digital sum value for specifying the recording data including the primary synchronization signal for the synchronization frame that is to be written next with a second accumulated digital sum value for specifying the recording data including the secondary synchronization signal for the synchronization frame that is to be written next, and for generating a first selection signal based on the comparison. An inverter randomly inverts the first selection signal to generate a second selection signal. A selection circuit receives the primary synchronization signal and the secondary synchronization signal, and outputs either one of the primary synchronization signal and the secondary synchronization signal in response to the second selection signal.

Another aspect is a device for writing recording data including a plurality of synchronization frames to a phase-change optical disc. Each of the plurality of synchronization frames includes either one of a primary synchronization signal and a secondary synchronization signal. The device includes a comparator for comparing a first accumulated digital sum value for specifying the recording data including the primary synchronization signal for the synchronization frame that is to be written next with a second accumulated digital sum value for specifying the recording data including the secondary synchronization signal for the synchronization frame that is to be written next, and for generating a first selection signal based on the comparison. An inverter inverts the first selection signal for every predetermined number of synchronization frames to generate a second selection signal. A selection circuit receives the primary synchronization signal and the secondary synchronization signal, and outputs either one of the primary synchronization signal and the secondary synchronization signal in response to the second selection signal.

A further aspect is a method for writing recording data including a plurality of synchronization frames to a phase-change optical disc. Each of the plurality of synchronization frames includes either one of a primary synchronization signal and a secondary synchronization signal. The method includes comparing a first accumulated digital sum value for specifying the recording data including the primary synchronization signal for the synchronization frame that is to be written next with a second accumulated digital sum value for specifying the recording data including the secondary synchronization signal for the synchronization frame that is to be written next, generating a result of the comparison, generating a first selection signal based on the comparison result, selectively inverting the first selection signal to generate a second selection signal, and outputting either one of the primary synchronization signal and the secondary synchronization signal in response to the second selection signal.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 3 is a schematic diagram showing the data structure of the synchronization signal in FIG. 2;

FIG. 4A is a diagram illustrating the DSV of a primary synchronization signal SYNC;

FIG. 4B is a diagram illustrating the DSV of a secondary synchronization signal SYNC;

FIG. 5 is a diagram showing 14T overlapping portions of synchronization information with the writing method of the prior art;

DETAILED DESCRIPTION OF THE PREFERRED EMBODIMENTS

Figure 1:
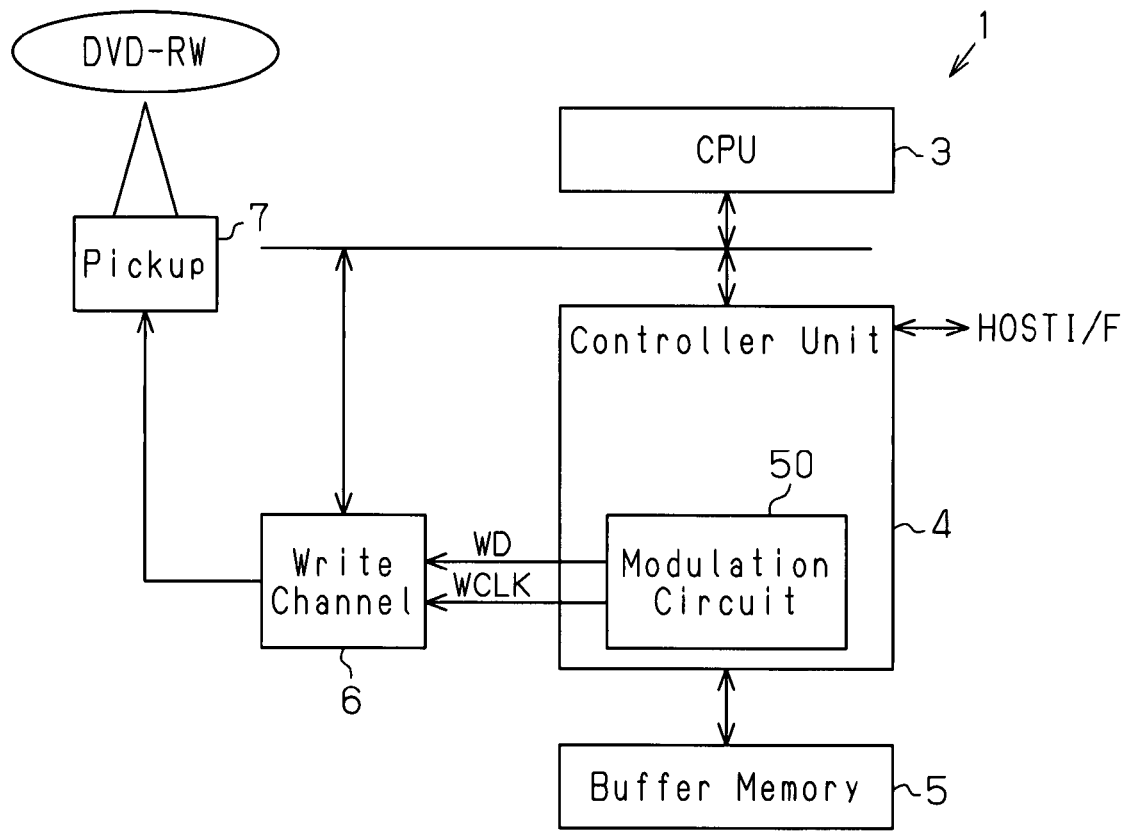
FIG. 1 is a schematic block diagram of a conventional data writing device.
Figure 6:
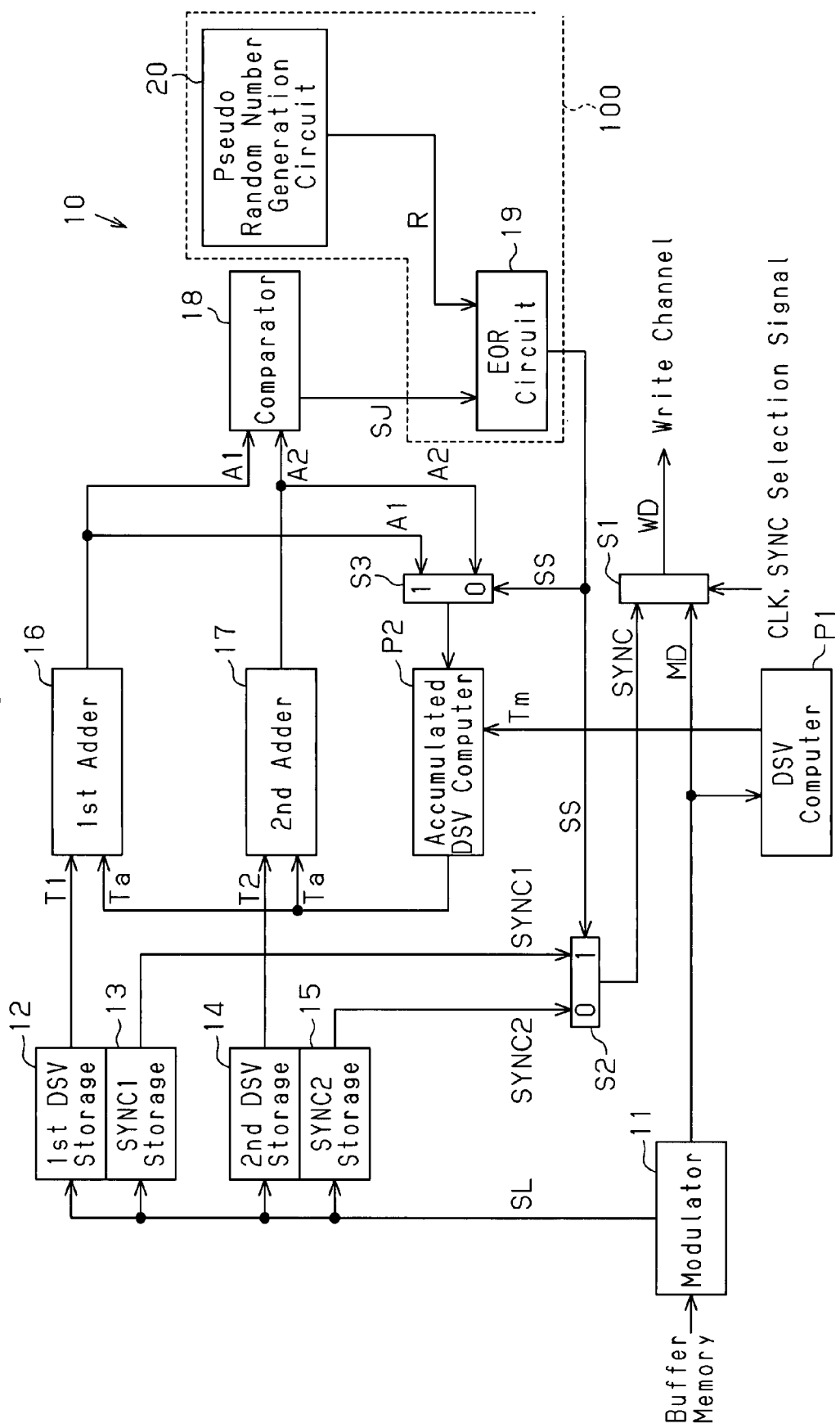
FIG. 6 is a schematic block diagram of a modulation circuit according to a first embodiment of the present invention.

A modulation circuit 10 for a data writing device according to a first embodiment of the present invention will now be described with reference to FIGS. 6 to 8. FIG. 6 shows the modulation circuit 10 of the first embodiment incorporated in a controller unit 4 of a data writing device 1 (refer to FIG. 1). The modulation circuit 10 of the first embodiment generates write data WD recorded onto a DVD–RW in the same manner as the conventional modulation circuit 50.

As shown in FIG. 6, the modulation circuit 10 includes a modulator 11 for modulating the data that is to be recorded and read from a buffer memory by performing eight-to-sixteen modulation. The modulator 11 converts the data that has been modulated through eight-to-sixteen modulation into the NRZI format to generate modulation data MD. The modulator 11 provides the generated modulation data MD to a DSV computer P1 and a first selection circuit S1. The modulation data MD includes marks and spaces each having a data length of 3T to 1T. The modulator 11 determines whether the final modulation data of each synchronization frame is a mark or a space and provides a determination signal SL indicating the determination result to a first DSV storage 12, a SYNC1 storage 13, a second DSV storage 14, and a SYNC2 storage 15.

The DSV computer P1 computes a DSV Tm of the modulation data MD from the modulator 11. Then, the DSV computer P1 provides the computed DSV Tm to an accumulated DSV computer P2.

The SYNC1 storage 13 stores the primary synchronization signal SYNC1 for each of the synchronization signals SY0 to SY7 shown in FIG. 3. As shown in FIG. 7, each primary synchronization signal SYNC1, which is in the NRZI format, changes depending on the preceding data. Thus, the SYNC1 storage 13 converts the primary synchronization signal SYNC1 corresponding to each frame number into the NRZI format based on the determination signal SL input from the modulator 11. Then, the SYNC1 storage 13 provides the primary synchronization signal SYNC1 in the NRZI format to a second selection circuit S2.

The first DSV storage 12 stores the DSV T1 for each of eight primary synchronization signals SYNC1 stored in the SYNC1 storage 13. As shown in FIG. 7, each DSV T1 changes depending on the preceding data. Thus, for each primary synchronization signal SYNC1, the first DSV storage 12 stores two DSVs T1, one for when the preceding data bit is a mark and the other for when the preceding data bit is a space. The first DSV storage 12 provides the DSV T1 associated with the primary synchronization signal SYNC1 output from the SYNC1 storage 13 to a first adder 16.

The SYNC2 storage 15 stores the secondary synchronization signal SYNC2 for each of the synchronization signal SY0 to SY7. The SYNC2 storage 15 converts the secondary synchronization signal SYNC2 corresponding to each frame number into the NRZI format based on the determination signal SL. Then, the SYNC2 storage 15 provides the secondary synchronization signal SYNC2 in the NRZI format to the second selection circuit S2.

The second DSV storage 14 stores the DSV T2 of each of the eight secondary synchronization signals SYNC2 stored in the SYNC2 storage 15. For each secondary synchronization signal SYNC2, the second DSV storage 14 stores two DSVs T2, one for when the preceding data bit is a mark and the other for when the preceding data bit is a space. The second DSV storage 14 provides the DSV T2 associated with the secondary synchronization signal SYNC2 output from the SYNC2 storage 15 to a second adder 17.

The first adder 16 is provided with the DSV T1 associated with the primary synchronization signal SYNC1 from the first DSV storage 12. The first adder 16 is also provided with the accumulated DSV Ta of the preceding data from the accumulated DSV computer P2. The first adder 16 adds the DSV T1 and the accumulated DSV Ta and provides the sum A1 (first accumulated value) to a comparator 18 and a third selection circuit S3.

The second adder 17 is provided with the DSV T2 associated with the secondary synchronization signal SYNC2 from the second DSV storage 14. The second adder 17 is also provided with the accumulated DSV Ta of the preceding data from the accumulated DSV computer P2. The second adder 17 adds the DSV T2 and the accumulated DSV Ta together and provides the sum A2 (second accumulated value) to the comparator 18 and the third selection circuit S3.

The comparator 18 compares the absolute value of the sum A1 from the first adder 16 with the absolute value of the sum A2 from the second adder 17. The comparator 18 provides an EOR circuit 19 with a determination signal SJ (first selection signal) having a logic value of "1" when the absolute value of the sum A1 is smaller and a determination signal SJ having a logic value of "0" when the absolute value of the sum A2 is smaller.

A pseudo random number generation circuit 20 connected to the EOR circuit 19 generates and provides the EOR circuit 19 with a pseudo random number R. The EOR circuit 19 and the pseudo random number generation circuit 20 form an inverter 100. FIG. 8 shows the internal structure of the pseudo random number generation circuit 20.

Figure 8:
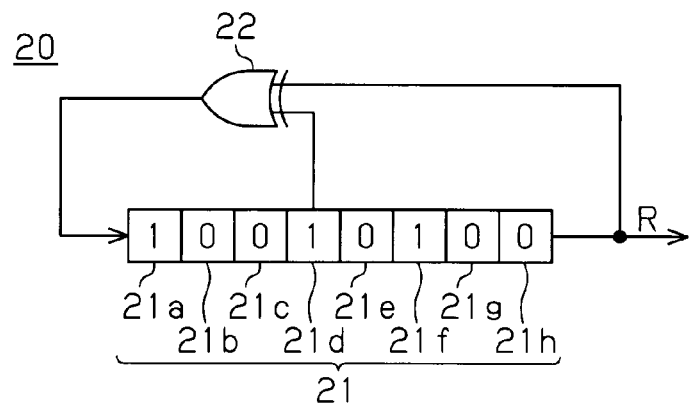
FIG. 8 is a schematic block circuit diagram of a pseudo random number generation circuit shown in FIG. 6.

As shown in FIG. 8, the pseudo random number generation circuit 20 is preferably a negative feedback shift register circuit including a shift register unit 21 having registers 21a to 21h and an EOR circuit 22. In detail, in the shift register unit 21, each of the registers 21a to 21h has a logic value that is shifted to the register at its right in synchronization with a clock signal (not shown). More specifically, in FIG. 8, the logic value of "1" for the register 21a shifts to the register 21b, and the logic value of "0" for the register 21b shifts to the register 21c. In this case, the logic value of "0" for the register 21h is output from the pseudo random number generation circuit 20 as the pseudo random number R. The logic value of "0" for the register 21h is also provided to the EOR circuit 22. The EOR circuit 22 receives the logic value of "0" of the register 21h and the logic value of "1" of the register 21d and provides an EOR operation result of the logic value of "1" and the logic value of "0" as a logic value of "1" to the register 21a. As a result, the logic value of the register 21a becomes "1." In this manner, the logic value of each of the registers 21a to 21h shifts one by one, and the pseudo random number R is output from the register 21h.

As shown in FIG. 6, the EOR circuit 19 provides a selection signal SS (second selection signal) to the second selection circuit S2 and the third selection circuit S3 in response to the determination signal SJ from the comparator 18 and the pseudo random number R from the pseudo random number generation circuit 20. In detail, the EOR circuit 19 generates a selection signal SS having a logic value of "1" in response to a determination signal SJ having a logic value of "1" and a pseudo random number R having a logic value of "0," and generates a selection signal SS having a logic value of "0" in response to a determination signal SJ having a logic value of "1" and a pseudo random number R having a logic value of "1." Further, the EOR circuit 19 generates a selection signal SS having a logic value of "1" in response to a determination signal SJ having a logic value of "0" and a pseudo random number R having a logic value of "1," and generates a selection signal SS having a logic value of "0" in response to a determination signal SJ having a logic value of "0" and a pseudo random number R having a logic value of "0." More specifically, the EOR circuit 19 outputs the selection signal SS having the logic value of "0" when the logic value of the determination signal SJ and the logic value of the pseudo random number R are the same, outputs the selection signal SS having the logic value of "1" when the logic value of the determination signal SJ differs from the logic value of the pseudo random number R.

The third selection circuit S3 provides the sum A1 from the first adder 16 to the accumulated DSV computer P2 in response to the selection signal SS having the logic value of "1," and provides the sum A2 from the second adder 17 to the accumulated DSV computer P2 in response to the selection signal SS having the logic value of "0."

The accumulated DSV computer P2 computes the latest accumulated DSV Ta. More specifically, when the accumulated DSV computer P2 receives the DSV Tm of the modulation data MD from the DSV computer P1, the accumulated DSV computer P2 adds the received DSV Tm to the stored accumulated DSV Ta and stores the sum as the latest accumulated DSV Ta. Further, when the accumulated DSV computer P2 receives the sum A1 or the sum A2 from the third selection circuit S3, the accumulated DSV computer P2 stores the sum A1 (or A2) as the accumulated DSV Ta. The accumulated DSV computer P2 provides the accumulated DSV Ta to the first adder 16 and the second adder 17 as described above.

The second selection circuit S2 provides the primary synchronization signal SYNC1 to the first selection circuit S1 as the synchronization information SYNC in response to the selection signal SS having the logic value of "1," and provides the secondary synchronization signal SYNC2 to the first selection circuit S1 as the synchronization information SYNC in response to the selection signal SS having the logic value of "0."

The first selection circuit S1 switches its output data between the modulation data MD and the synchronization information SYNC based on the SYNC selection signal from the controller unit 4 (refer to FIG. 1) and the clock signal. More specifically, the first selection circuit S1 provides the synchronization information SYNC to the write channel unit 6 (FIG. 1) as the write data WD from when receiving the SYNC selection signal from the controller unit 4 until when counting a predetermined clock. Further, the first selection circuit S1 provides the modulation data MD to the write channel unit 6 as the write data WD at other timings. The SYNC selection signal is provided to the first selection circuit S1 by dividing the modulation data MD into units of 91 bytes.

The operation of the modulation circuit 10 will now be described.

Figure 2:
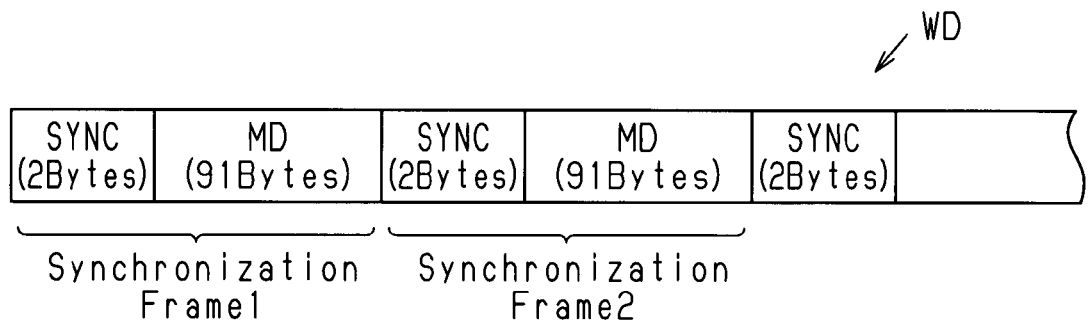
FIG. 2 is a schematic diagram showing the structure of write data.

First, the modulation circuit 10 selects the synchronization information SYNC of the synchronization frame 1 (refer to FIG. 2). More specifically, the primary synchronization signal SYNC1 of the synchronization signal SY0 corresponding to the synchronization frame 1 is provided from the SYNC1 storage 13 to the second selection circuit S2, and the secondary synchronization signal SYNC2 of the synchronization signal SY0 is provided from the SYNC2 storage 15 to the second selection circuit S2. The first DSV storage 12 provides the DSV T1 associated with the primary synchronization signal SYNC1 of the synchronization signal SY0 to the first adder 16. The second DSV storage 14 provides the DSV T2 associated with the secondary SYNC2 of the synchronization signal SY0 to the second adder 17. In compliance with the DVD-RW standard, the synchronization signal SY0 of the synchronization frame 1 starts from the logic value of "0" as shown in FIG. 4. When the synchronization signal SY0 is output, the storage 12 always outputs the DSV T1 of −10 and the storage 14 always outputs the DSV T2 of +4.

In the synchronization frame 1, the accumulated DSV Ta is 0. Thus, the first adder 16 provides the comparator 18 with the DSV T1 of −10 directly as the sum A1. The second adder 17 provides the comparator 18 with the DSV T2 of +4 directly as the sum A2.

Next, the comparator 18 compares the absolute value (10) of the sum A1 with the absolute value (4) of the sum A2. In this case, the absolute value of the sum A2 is smaller than the absolute value of the sum A1. Thus, the comparator 18 provides the determination signal SJ having the logic value of "0" to the EOR circuit 19.

The conventional modulation circuit 50 does not include the EOR circuit 19 and the pseudo random number generation circuit 20. Thus, in the conventional structure, the determination signal SJ having the logic value of "0" is directly provided to the second selection circuit S2, and the second selection circuit S2 selects the secondary synchronization signal SYNC2 as the synchronization information SYNC in response to the determination signal SJ (0). Thus, the conventional structure always selects the secondary synchronization signal SYNC2 of the synchronization signal SY0 as the synchronization information SYNC of the synchronization frame 1. More specifically, the secondary synchronization signal SYNC2 of the synchronization signal SY0 is always written as the synchronization information SYNC of the synchronization frame 1 irrespective of the type of the modulation data MD (data to be recoded that is input via the host interface HOST I/F). When the same data is repeatedly written at the same position in this manner, a mark and its vicinity deteriorate due to thermal damage. This decreases the rewritable number of times of the phase-change optical disc, as described above.

Accordingly, the modulation circuit 10 of the first embodiment includes the EOR circuit 19 and the pseudo random number generation circuit 20. The pseudo random number generation circuit 20 generates the pseudo random number R, and the EOR circuit 19 performs a logical operation with the pseudo random number R and the determination signal SJ to randomly generate the selection signal SS having an inverted logic value of the determination signal SJ and provides the selection signal SS to the second selection circuit S2. The selection signal SS having the inverted logic value is randomly generated based on the random number generated by the negative feedback register circuit (the shift register unit 21 and the EOR circuit 22). As a result, the modulation circuit 10 prevents the same data from being written at the same position.

More specifically, the EOR circuit 19 generates the selection signal SS having the same logic value as the determination signal SJ when receiving the pseudo random number R having the logic value of "0" while being provided with the determination signal SJ having the logic value of "0" as described above. Thus, the second selection circuit S2 selects the secondary synchronization signal SYNC2 as the synchronization information SYNC in response to the selection signal SS having the logic value of "0." The EOR circuit 19 generates the selection signal SS having the inverted logic value of the determination signal SJ when receiving the pseudo random number R having the logic value of "1" while being provided with the determination signal SJ having the logic value of "0." Thus, the second selection circuit S2 selects the primary synchronization signal SYNC1 as the synchronization information SYNC in response to the selection signal SS having the logic value of "1."

In this manner, the EOR circuit 19 changes the logic value of the determination signal SJ in accordance with the logic value of the pseudo random number R. The logic value of the pseudo random number R is randomly changed by the negative feedback shift register circuit shown in FIG. 8. As a result, the logic value of the determination signal SJ from the comparator 18 is randomly changed or inverted based on the pseudo random number R so that the selection signal SS having the inverted logic value of the determination signal SJ is provided to the second selection circuit S2. As a result, the second selection circuit S2 selects the synchronization signal (e.g., the secondary synchronization signal SYNC2), which is inverse to the synchronization signal (e.g., the primary synchronization signal SYNC1) that is selected based on the logic value of the determination signal SJ from the comparator 18. In this manner, the synchronization information SYNC output from the second selection circuit S2 changes in accordance with the selection signal SS. As a result, even when write data WD is repeatedly generated from the same data that is to be recorded, the synchronization information SYNC is randomly changed whenever the write data WD is generated. This prevents the same data from being written at the same position.

The first selection circuit S1 receives the SYNC selection signal from the controller unit 4 and provides the synchronization information SYNC, which is either the primary synchronization signal SYNC1 or the secondary synchronization signal SYNC2, to the write channel unit 6 as the write data WD.

The synchronization information SYNC of the synchronization frame 2 and subsequent frames is also selected based on the logic value of the determination signal SJ that is randomly inverted. The selection of the synchronization information SYNC of the synchronization frame 2 when the secondary synchronization signal SYNC2 is selected as the synchronization information SYNC of the synchronization frame 1 will now be described.

When the selection signal SS having the logic value of "0" is output from the EOR circuit 19, the second selection circuit S2 provides the secondary synchronization signal SYNC2 to the first selection circuit S1, and the third selection circuit S3 provides the sum A2 (+4) to the accumulated DSV computer P2. The accumulated DSV computer P2 stores the sum A2 (+4) as the accumulated DSV Ta.

The first selection circuit S1 selects the modulation data MD of the synchronization frame 1 from the modulator 11 as the write data WD when a predetermined clock elapses after receiving the SYNC selection signal and provides the modulation data MD (WD) to the write channel unit 6. Then, the DSV computer P1 computes the DSV Tm associated with the modulation data MD of the synchronization frame 1. In the present specification, it is assumed that the DSV Tm associated with the modulation data MD of the synchronization frame 1 is +6, and the final bit of the modulation data MD is a space.

The DSV computer P1 provides the computed DSV Tm (+6) to the accumulated DSV computer P2. The accumulated DSV computer P2 adds the DSV Tm (+6) and the accumulated DSV Ta (+4) together and stores the accumulated DSV Ta (+10) indicating the sum.

Figure 7A:
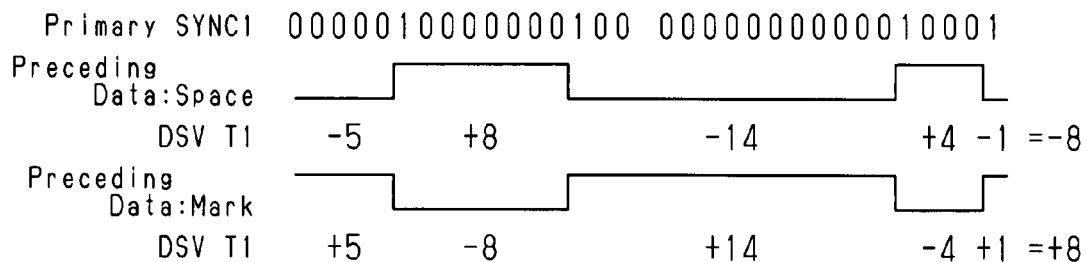
FIG. 7A is a diagram illustrating the DSV of a primary synchronization signal SYNC.
Figure 7B:
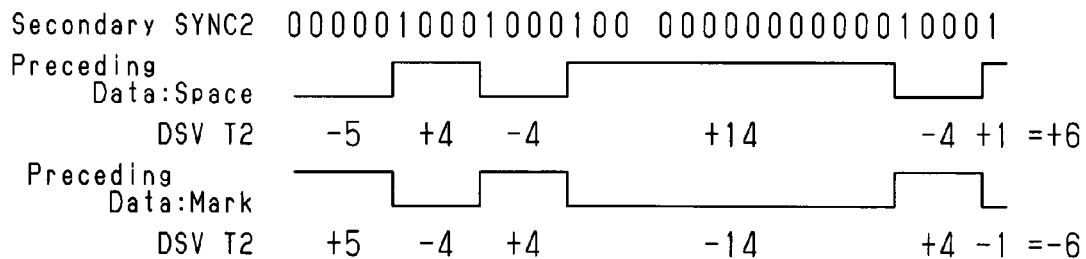
FIG. 7B is a diagram illustrating the DSV of a secondary synchronization signal SYNC.

When the modulator 11 outputs the modulation data MD of the synchronization frame 1, the modulator 11 provides the first DSV storages 12, the second DSV storages 14, the SYNC1 storage 13, and the SYNC2 storage 15 with the determination signal SL indicating that the final bit of the modulation data MD is a space. As a result, the SYNC1 storage 13 outputs the primary synchronization signal SYNC1 of the synchronization signal SY1 in the NRZI format and the SYNC2 storage 15 outputs the secondary synchronization signal SYNC2 of the synchronization signal SY1 in the NRZI format based on the determination signal SL and the frame number. As shown in FIG. 7A, when the preceding data is a space, the DSV T1 of the primary synchronization signal SYNC1 of the synchronization signal SY1 is −8. In this case, the first DSV storage 12 provides the DSV T1 of −8 to the first adder 16. As shown in FIG. 7B, when the preceding data is a space, the DSV T2 of the secondary synchronization signal SYNC2 of the synchronization signal SY1 is +6. In this case, the second DSV storage 14 provides the DSV T2 of +6 to the second adder 17. Further, each of the first adder 16 and the second adder 17 is provided with the accumulated DSV Ta (+10) from the accumulated DSV computer P2.

The first adder 16 adds the DSV T1 (−8) and the accumulated DSV Ta (+10) and provides the sum A1 (+2) to the comparator 18. The second adder 17 adds the DSV T2 (+6) and the accumulated DSV Ta (+10) and provides the sum A2 (+16) to the comparator 18.

The comparator 18 compares the absolute value (2) of the sum A1 and the absolute value (16) of the sum A2. In this case, the comparator 18 determines that the absolute value of the sum A1 is smaller than the absolute value of the sum A2 and provides the determination signal SJ having the logic value of "1" to the EOR circuit 19.

Here, in the same manner as in the synchronization frame 1, the pseudo random number R is provided from the pseudo random number generation circuit 20 to the EOR circuit 19. Based on the pseudo random number R, the EOR circuit 19 changes the logic value of the selection signal SS. More specifically, when receiving the pseudo random number R having the logic value of "1," the EOR circuit 19 generates the selection signal SS having the logic value of "0" in response to the determination signal SJ having the logic value of "1" and the pseudo random number R having the logic value of "1." As a result, the second selection circuit S2 selects the primary synchronization signal SYNC1 of the synchronization signal SY1 as the synchronization information SYNC in response to the selection signal SS having the logic value of "0." When receiving the pseudo random number R having the logic value of "0," the EOR circuit 19 generates the selection signal SS having the logic value of "1" in response to the determination signal SJ having the logic value of "1" and the pseudo random number R having the logic value of "0." As a result, the second selection circuit S2 selects the secondary synchronization signal SYNC2 of the synchronization signal SY1 as the synchronization information SYNC in response to the selection signal SS having the logic value of "0." Then, the first selection circuit S1 receiving the SYNC selection signal from the controller unit 4 provides the synchronization information SYNC that is either the primary synchronization signal SYNC1 or the secondary synchronization signal SYNC2 to the write channel unit 6 as the write data WD.

The modulation circuit 10 of the first embodiment has the advantages described below.

(1) The modulation circuit 10 includes the pseudo random number generation circuit 20 for generating the pseudo random number R and the EOR circuit 19 for performing a logical operation with the pseudo random number R and the determination signal SJ is provided from the comparator 18. The EOR circuit 19 generates the selection signal SS having the logic value of "0" when the logic value of the pseudo random number R is the same as the logic value of the determination signal SJ, and generates the selection signal SS having the logic value of "1" when the logic value of the pseudo random number R differs from the logic value of the determination signal SJ. The logic value of the pseudo random number R is randomly changed by the negative feedback shift register shown in FIG. 8. Thus, the EOR circuit 19 randomly changes the logic value of the determination signal SJ output from the comparator 18 based on the pseudo random number R. As a result, the second selection circuit S2 selectively provides the first selection circuit S1 with the synchronization signal corresponding to the logic value of the determination signal SJ (e.g., the primary synchronization signal SYNC1) and the synchronization signal corresponding to the inverted logic value of the determination signal SJ (e.g., the secondary synchronization signal SYNC2) in accordance with the logic value of the selection signal SS from the EOR circuit 19. In this manner, the synchronization information SYNC output from the second selection circuit S2 is changed based on the selection signal SS. This enables the synchronization information SYNC to be randomly changed whenever the write data WD is generated irrespective of the type of data that is to be recorded. This prevents the same data from being written at the same position and prevents deterioration of the disc due to repetitive writing.

When the synchronization information SYNC is changed in this manner, the final data of the synchronization information SYNC changes between a mark and a space. As a result, the first data of the modulation data MD following the synchronization information SYNC changes between a mark and a space. In this manner, a change in the synchronization information SYNC also changes the modulation data MD following the synchronization information SYNC.

Thus, the modulation circuit 10 of the first embodiment practically eliminates the possibility of generating exactly the same write data WD even if it generated from the same data for recording. This prevents the same data from being written at the same position, and prevents the number of rewritable times of the phase-change optical disc from decreasing.

(2) The synchronization information SYNC of the synchronization frame 1 is conventionally the same irrespective of the type of data to be recorded. In contrast, the modulation circuit 10 of the first embodiment randomly inverts the logic value of the determination signal SJ based on the pseudo random number R to change the synchronization information SYNC of the synchronization frame 1. This prevents the synchronization information SYNC of the synchronization frame 1 from deteriorating. The synchronization information SYNC of the synchronization frame 1 (data immediately following the recording start point) is changeable so that the write data WD following the synchronization information SYNC is changed in a preferable manner even if the same data for recording is repeatedly recorded.

A modulation circuit 30 according to a second embodiment of the present invention will now be described with reference to FIG. 9. The modulation circuit 30 of the second embodiment includes a determination circuit 31 in addition to the structure of the modulation circuit 10 of the first embodiment. The second embodiment will be described focusing on its differences from the first embodiment. The components in the second embodiment that are the same as the components shown in FIGS. 6 to 8 are given the same reference numerals and will not be described in detail.

Figure 9:
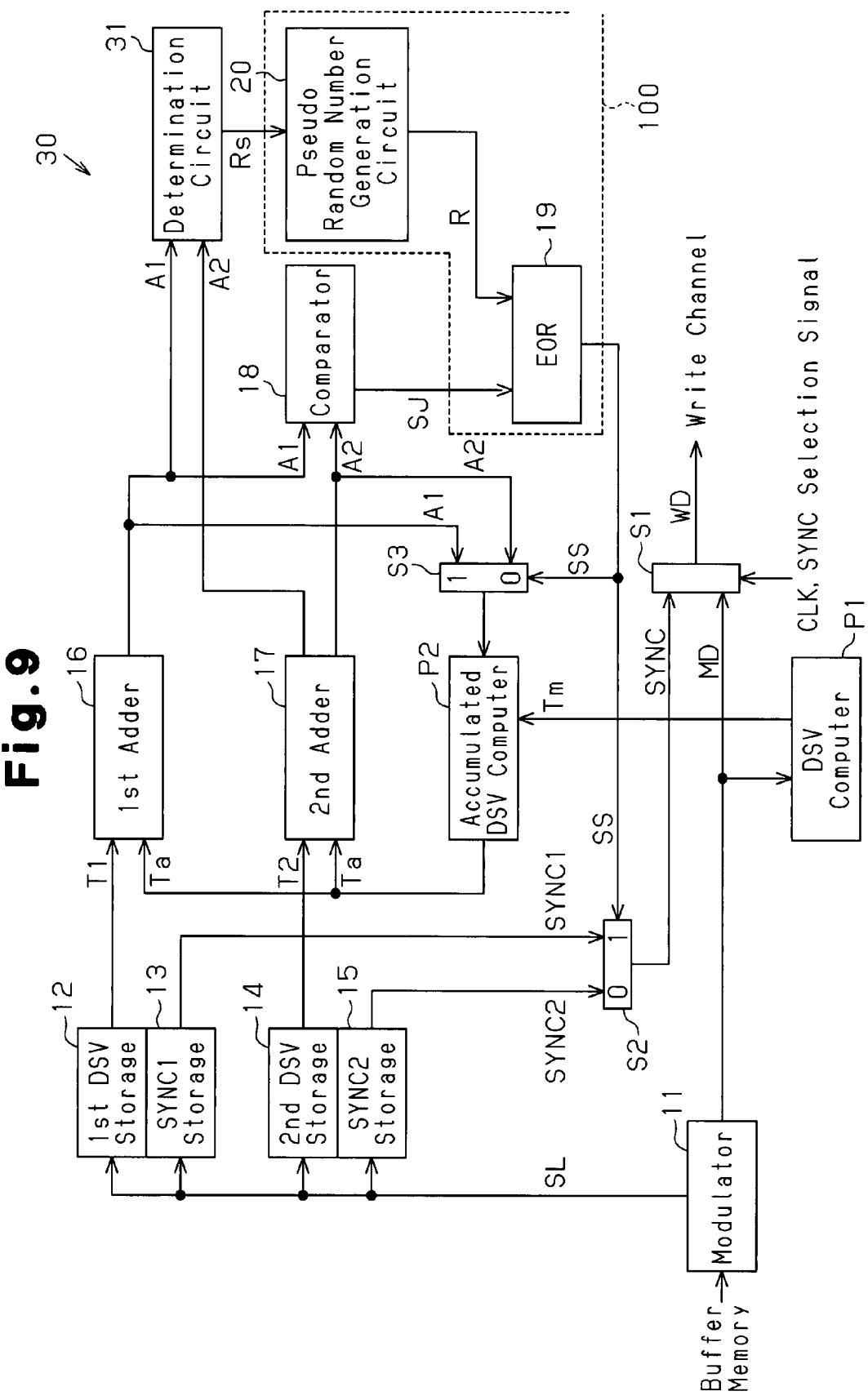
FIG. 9 is a block diagram of a modulation circuit according to a second embodiment of the present invention.

As shown in FIG. 9, the determination circuit 31 is provided with the sum A1 from the first adder 16 and a sum A2 from the second adder 17. The determination circuit 31 compares the absolute value of each of the sums A1 and A2 with a prestored threshold. The determination circuit 31 provides the pseudo random number generation circuit 20 with a reset signal Rs (accumulated value determination signal) when at least one of the sums A1 and A2 is greater than the threshold.

The pseudo random number generation circuit 20 stops the operation of its negative feedback register, that is, stops outputting a pseudo random number R, in response to the reset signal Rs from the determination circuit 31. As a result, an EOR circuit 19 generates a selection signal Ss having the logic value of a determination signal SJ provided from a comparator 18. More specifically, when the reset signal Rs is output from the determination circuit 31, the logic value of the determination signal SJ (selection signal SS) is not inverted based on the pseudo random number R.

The operation of the modulation circuit 30 will now be described. The threshold of the determination circuit 31 is set, for example, at 14.

First, the modulation circuit 30 selects the synchronization information SYNC of a synchronization frame 1 (refer to FIG. 2). More specifically, in the same manner as in the first embodiment, the primary synchronization signal SYNC1 and secondary synchronization signal SYNC2 (refer to FIG. 4) of the synchronization signal SY0 corresponding to the synchronization frame 1 are provided from the SYNC1 storage 13 and SYNC2 storage 15 to the second selection circuit S2. The first DSV storage 12 provides the DSV T1 of −10 to the first adder 16, and the second DSV storage 14 provides the DSV T2 of +4 to the second adder 17.

The first adder 16 provides the determination circuit 31 and the comparator 18 with the DSV T1 of −10 directly as the sum A1. The second adder 17 provides the determination circuit 31 and the comparator 18 with the DSV T2 of +4 directly as the sum A2. The determination circuit 31 compares the absolute value (10) of the sum A1 with the threshold (14), and also compares the absolute value (4) of the sum A2 with the threshold (14). The determination circuit 31 determines that the sums A1 and A2 are both smaller than the threshold. As a result, the determination circuit 31 does not provide the pseudo random number generation circuit 20 with the reset signal Rs. The pseudo random number generation circuit 20 operates in the same manner as in the first embodiment. More specifically, the EOR circuit 19 randomly inverts the logic value of the determination signal SJ based on the pseudo random number R, and generates the selection signal SS in the same manner as in the first embodiment.

Next, the modulation circuit 30 selects the synchronization information SYNC of the synchronization frame 2. Here, in the same manner as in the first embodiment, it is assumed that the first adder 16 obtains a sum A1 of +2, and the second adder 17 obtains a sum A2 of +16.

The first adder 16 provides the sum A1 of +2 to the determination circuit 31 and the comparator 18, and the second adder 17 provides the sum A2 of +16 to the determination circuit 31 and the comparator 18. The absolute value (2) of the sum A1 is smaller than the absolute value (16) of the sum A2. Thus, the comparator 18 provides the EOR circuit 19 with the determination signal SJ having the logic value of "1."

The determination circuit 31 compares the absolute value (2) of the sum A1 with the threshold (14). The determination circuit 31 also compares the absolute value (16) of the sum A2 with the threshold (14). In this case, the determination circuit 31 determines that the sum A2 is greater than the threshold. As a result, the determination circuit 31 provides the pseudo random number generation circuit 20 with the reset signal Rs. In response to the reset signal Rs, the pseudo random number generation circuit 20 stops the operation of the negative feedback shift register and stops outputting the pseudo random number R. More specifically, the pseudo random number generation circuit 20 fixes the logic value of the signal provided to the EOR circuit 19 to 0.

Accordingly, the EOR circuit 19 is not provided with the pseudo random number R from the pseudo random number generation circuit 20. Thus, the selection signal SS having the logic value "1" of the determination signal SJ is output from the EOR circuit 19. As a result, the second selection circuit S2 selects the primary synchronization signal SYNC1 as the synchronization information SYNC. The first selection circuit S1 receiving a SYNC selection signal from the controller unit 4 provides the synchronization information SYNC to the write channel unit 6 as the write data WD.

More specifically, in the second embodiment, when the sum A1 or A2, that is, the accumulated DSV Ta subsequent to the selection of the synchronization signal, exceeds the threshold, the operation of the pseudo random number generation circuit 20 is stopped, and the modulation circuit 30 operates in the same manner as the conventional modulation circuit 50.

The modulation circuit 30 of the second embodiment has the advantage described below in addition to advantages (1) and (2) of the first embodiment.

(3) As in the operation of the modulation circuit 20 of the first embodiment described above, the synchronization data having a greater DSV is selected from the two synchronization signals (the primary synchronization signal SYNC1 and the secondary synchronization signal SYNC2) when the logic value of the determination signal SJ is forcibly inverted based on the pseudo random number R. For example, if the logic value of the determination signal SJ is inverted each time based on the pseudo random number R, the accumulated DSV Ta increases gradually. An excessively large accumulated DSV Ta would increase low-frequency components of the write data and degrade the recording quality of the data or cause failures when the data is reproduced.

Therefore, the modulation circuit 30 of the second embodiment includes the determination circuit 31 for stopping the operation of the pseudo random number generation circuit 20 when the sum A1 or A2, that is, the accumulated DSV Ta subsequent to the selection of the synchronization signal, exceeds the threshold. This prevents the same data from being written at the same position and enables the determination circuit 31 to prevent the accumulated DSV Ta from increasing to or above the threshold. As a result, low-frequency components of the write data are not increased.

A modulation circuit 40 according to a third embodiment of the present invention will now be described with reference to FIG. 10. The modulation circuit 40 of the third embodiment includes a counter 41 and a fourth selection circuit S4 (selection switch) in lieu of the EOR circuit 19 of the first embodiment. The counter 41, the fourth selection circuit S4, and the pseudo random number generation circuit 20 form an inverter 110. The third embodiment will be described focusing on the differences from the first and second embodiments. The components in the third embodiment that are the same as the components shown in FIGS. 6 to 8 are given the same reference numerals and will not be described in detail.

Figure 10:
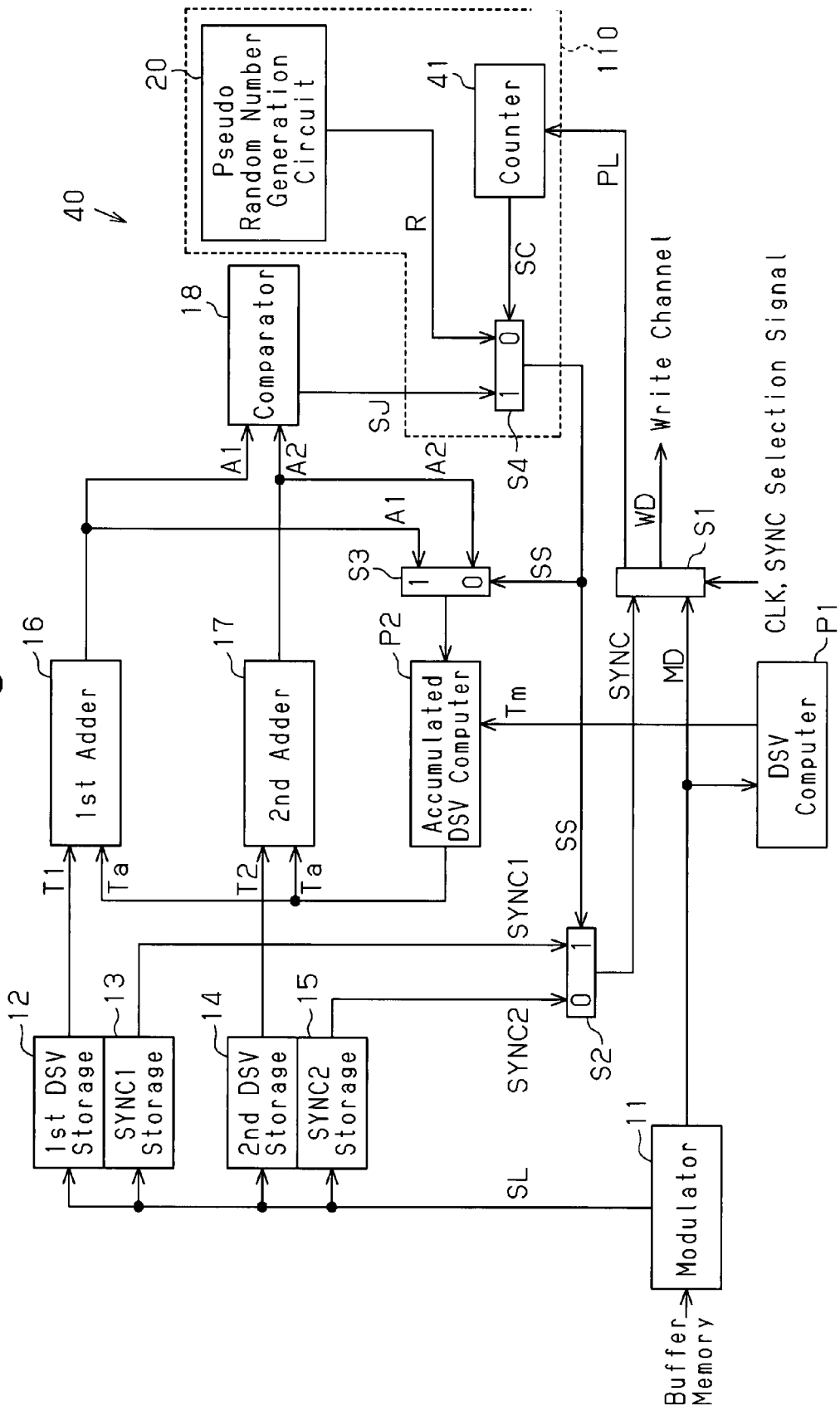
FIG. 10 is a block diagram of a modulation circuit according to a third embodiment of the present invention.

As shown in FIG. 10, the counter 41 is provided with a SYNC pass pulse PL from a first selection circuit S1. The SYNC pass pulse PL is generated by the first selection circuit S1 whenever synchronization information SYNC is output from the first selection circuit S1 as write data WD. The counter 41 increments its count value whenever receiving the SYNC pass pulse PL. The counter 41 provides the fourth selection circuit S4 with a signal SC (a count determination signal or an inversion control signal) having a logic value of "0" until the count value reaches a predetermined value. The counter 41 provides the fourth selection circuit S4 with a signal SC having a logic value of "1" when the count value reaches the predetermined value.

The fourth selection circuit S4 provides the second and third selection circuits S2 and S3 with a pseudo random number R from the pseudo random number generation circuit 20 as a selection signal SS when the signal SC having the logic value of "0" is being output from the counter 41. The fourth selection circuit S4 provides the second and third selection circuits S2 and S3 with a determination signal SJ from the comparator 18 as the selection signal SS when the signal SC having the logic value of "1" is output from the counter 41.

The operation of the modulation circuit 40 will now be described. Here, it is assumed that the predetermined value of the counter 41 is set, for example, at 3.

First, the modulation circuit 40 selects the synchronization information SYNC of a synchronization frame 1 (refer to FIG. 2). More specifically, in the same manner as in the first embodiment, the primary synchronization signal SYNC1 and secondary synchronization signal SYNC2 (refer to FIG. 4) of the synchronization signal SY0 corresponding to the synchronization frame 1 are provided from a SYNC1 storage 13 and a SYNC2 storage 15 to the second selection circuit S2. In this state, the first DSV storage 12 provides a DSV T1 of −10 to the first adder 16, and the second DSV storage 14 provides the DSV T2 of +4 to the second adder 17.

The first adder 16 provides the DSV T1 of −10 to the comparator 18 directly as a sum A1, and the second adder 17 provides the DSV T2 of +4 to the comparator 18 directly as a sum A2.

The comparator 18 compares the absolute value (10) of the sum A1 and the absolute value (4) of the sum A2. In this case, the absolute value of the sum A2 is smaller than the absolute value of the sum A1. Thus, the comparator 18 provides the determination signal SJ having the logic value of "0" to the fourth selection circuit S4.

The pseudo random number generation circuit 20 provides the pseudo random number R having the logic value that randomly changes to the fourth selection circuit S4. Here, it is assumed that the logic value of the pseudo random number R has an inverted logic value "1" of the determination signal SJ.

At this timing, the counter 41 is not yet provided with the SYNC pass pulse PL from the first selection circuit S1. Thus, the count value of the counter 41 is 0. The counter 41 provides the signal SC having the logic value of "0" to the fourth selection circuit S4.

The fourth selection circuit S4 provides the second and third selection circuits S2 and S3 with the pseudo random number R having the logic value of "1" (inverted logic value of the determination signal SJ) as the selection signal SS in response to the signal SC having the logic value of "0." As a result, the second selection circuit S2 selects the primary synchronization signal SYNC1 as the synchronization information SYNC. The synchronization information SYNC is provided to a write channel unit 6 as write data WD via the first selection circuit S1 receiving a SYNC selection signal from the controller unit 4. The first selection circuit S1 outputs the synchronization information SYNC as the write data WD, and at the same time provides the SYNC pass pulse PL to the counter 41. The counter 41 increments the count value in response to the SYNC pass pulse PL. As a result, the count value is updated to 1. Hereafter, the counter 41 increments the count value to 2, 3, 4, etc. in response to the SYNC pass pulse PL output from the first selection circuit S1 together with the synchronization information SYNC of each of the synchronization frames 2, 3, 4, etc. Then, the counter 41 provides the fourth selection circuit S4 with the signal SC having the logic value of "0" until the count value reaches the predetermined value of 3. When the count value reaches the predetermined value of 3, the counter 41 provides the fourth selection circuit S4 with the signal SC having the logic value of "1."

In the third embodiment, the fourth selection circuit S4 selects the logic value of the pseudo random number R, which randomly changes, as the selection signal SS irrespective of the determination signal SJ until the count value of the counter 41 reaches the predetermined value (3 in this case). As a result, in the same manner as in the first embodiment, the synchronization information SYNC randomly changes whenever the write data WD is generated irrespective of the type of data that is recorded. This prevents the same data from being written at the same position and prevents the disc from deteriorating due to repeated writing.

In the third embodiment, when the synchronization information SYNC of the synchronization frame 3 is output from the first selection circuit S1, the count value of the counter 41 reaches the predetermined value of 3. Then, the fourth selection circuit S4 selects the determination signal SJ from the comparator 18 as the selection signal SS irrespective of the pseudo random number R in response to the signal SC having the logic value of "1" from the counter 41. More specifically, in the third embodiment, the synchronization information SYNC of the synchronization frame 4 and the subsequent frames is selected in the same manner as in the conventional modulation circuit 50.

The modulation circuit 40 of the third embodiment has the advantage described below in addition to advantages (1) and (2) of the first embodiment.

(4) As described in the first and second embodiments, when the selection signal SS having the inverted logic value of the determination signal SJ is generated based on the pseudo random number R that changes randomly, the second selection circuit S2 selects the synchronization signal (the primary synchronization signal SYNC1 or the secondary synchronization signal SYNC2) having a greater DSV. When, for example, the selection signal SS having the inverted logic value of the determination signal SJ is generated every time based on the pseudo random number R, the accumulated DSV Ta increases gradually. An excessively large accumulated DSV Ta may increase low-frequency components of the write data and degrade the recording quality of the data or cause failures when the data is reproduced.

Therefore, the modulation circuit 40 of the third embodiment randomly selects the synchronization information SYNC based on the pseudo random number R in a predetermined number of synchronization frames (the synchronization frames 1 to 3 in the present example) in accordance with the count value of the counter 41. In other words, the synchronization information SYNC is selected in the third embodiment in the same manner as in the conventional modulation circuit 50 after the count value of the counter 41 exceeds the predetermined value (in the synchronization frame 4 and subsequent frames in the present example). This prevents the same data from being written at the same position and prevents the DSV from increasing. As a result, low-frequency components of the write data are prevented from increasing.

It should be apparent to those skilled in the art that the present invention may be embodied in many other specific forms without departing from the spirit or scope of the invention. Particularly, it should be understood that the present invention may be embodied in the following forms.

Figure 11:
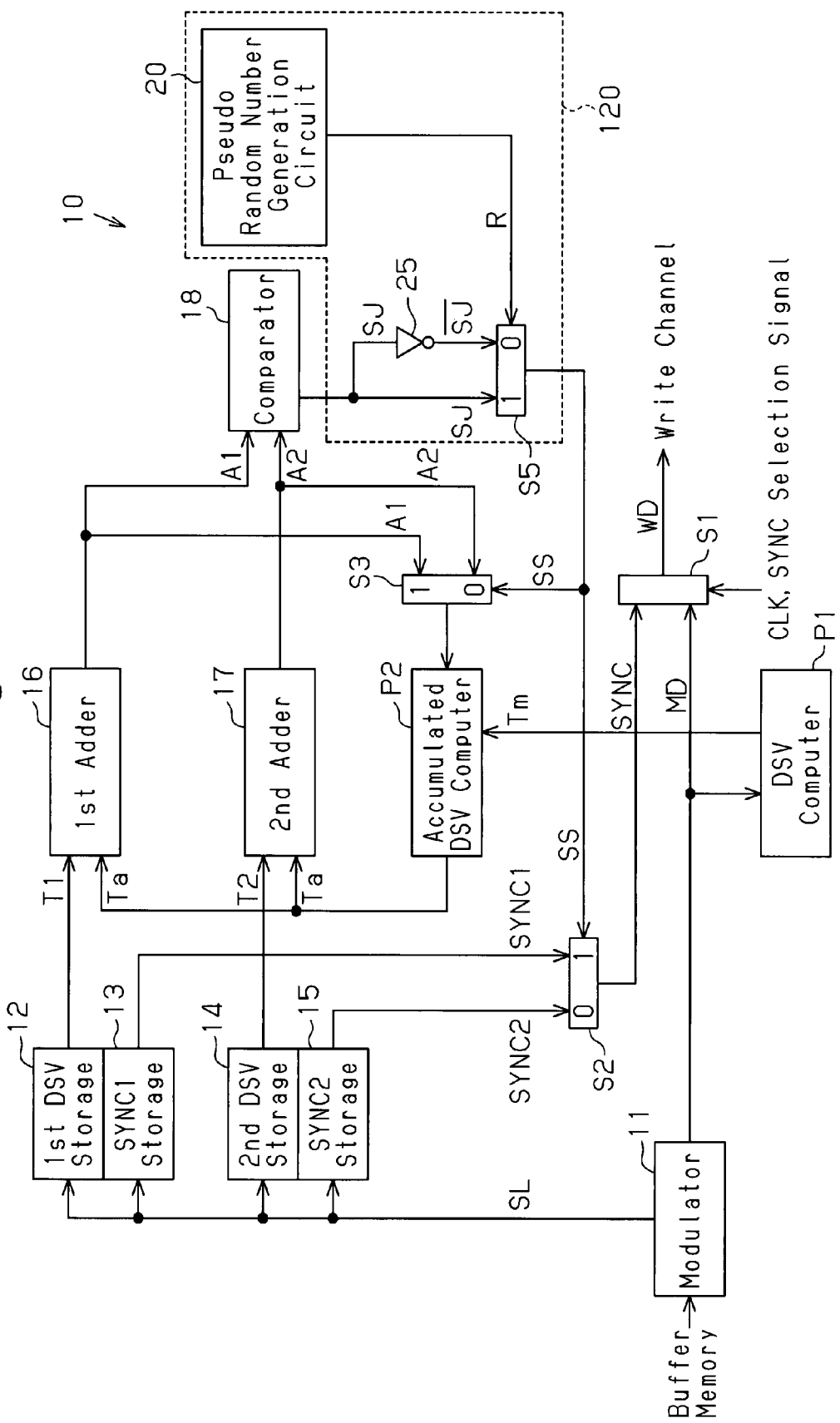
FIG. 11 is a block diagram of a modulation circuit according to a further embodiment of the present invention.

The modulation circuit 10 of the first embodiment may be modified to have the structure shown in FIG. 11. A modulation circuit 10 shown in FIG. 11 includes a NOT circuit 25 and a fifth selection circuit S5 (selection switch) in lieu of the EOR circuit 19 of the first embodiment. The NOT circuit 25, the fifth selection circuit S5, and the pseudo random number generation circuit 20 form an inverter 120. The fifth selection circuit S5 is provided with a determination signal SJ from the comparator 18 and an inverted signal SJ/ of the determination signal SJ generated by the NOT circuit 25. The fifth selection circuit S5 further uses a pseudo random number R from the pseudo random number generation circuit 20 as a switch signal. The fifth selection circuit S5 selects the determination signal SJ as the selection signal SS in response to a pseudo random number R having a logic value of "1" and selects the inverted signal SJ/ as the selection signal SS in response to a pseudo random number R having a logic value of "0." The determination signal SJ and the inverted signal SJ/ are switched based on the pseudo random number R that randomly changes. More specifically, the selection signal SS (inverted signal SJ/) having the inverted logic value of the determination signal SJ is randomly generated in the same manner as in the first embodiment. As a result, the modulation circuit 10 shown in FIG. 11 has the same advantages as the modulation circuit 10 of the first embodiment.

Figure 12:
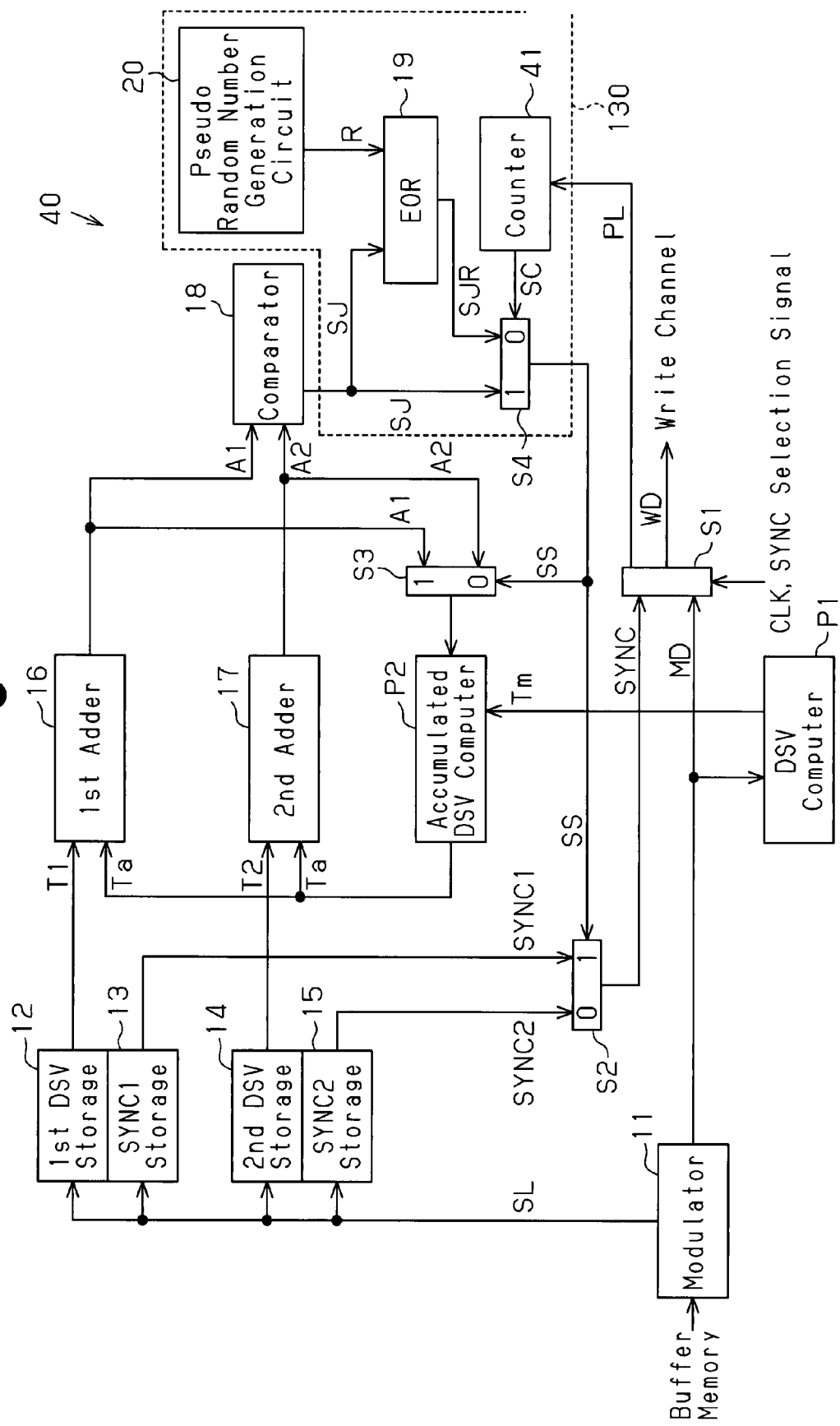
FIG. 12 is a block diagram of a modulation circuit according to another embodiment of the present invention.

The modulation circuit 40 of the third embodiment may be modified to have the structure shown in FIG. 12. A modulation circuit 40 shown in FIG. 12 includes the EOR circuit 19 of the first embodiment in addition to the structure of the modulation circuit 40 of the third embodiment. The EOR circuit 19, the fourth selection circuit S4, the counter 41, and the pseudo random number generation circuit 20 form an inverter 130. The EOR circuit 19 shown in FIG. 12 randomly changes the logic value of a determination signal SJ from a comparator 18 based on a pseudo random number R from the pseudo random number generation circuit 20, and generates a random signal SJR. The fourth selection circuit S4 selectively outputs the determination signal SJ from the comparator 18 and the random signal SJR from the EOR circuit 19 in response to a signal SC from the counter 41 having the same structure as the counter 41 shown in FIG. 10. As a result, the fourth selection circuit S4 outputs the random signal SJR as a selection signal SS in response to a signal SC having a logic value of "0" from the counter 41 and outputs the determination signal SJ as a selection signal SS in response to a signal SC having a logic value of "1" from the counter 41. Accordingly, the modulation circuit 40 shown in FIG. 12 has the same advantages as the modulation circuit 40 of the third embodiment.

Figure 13:
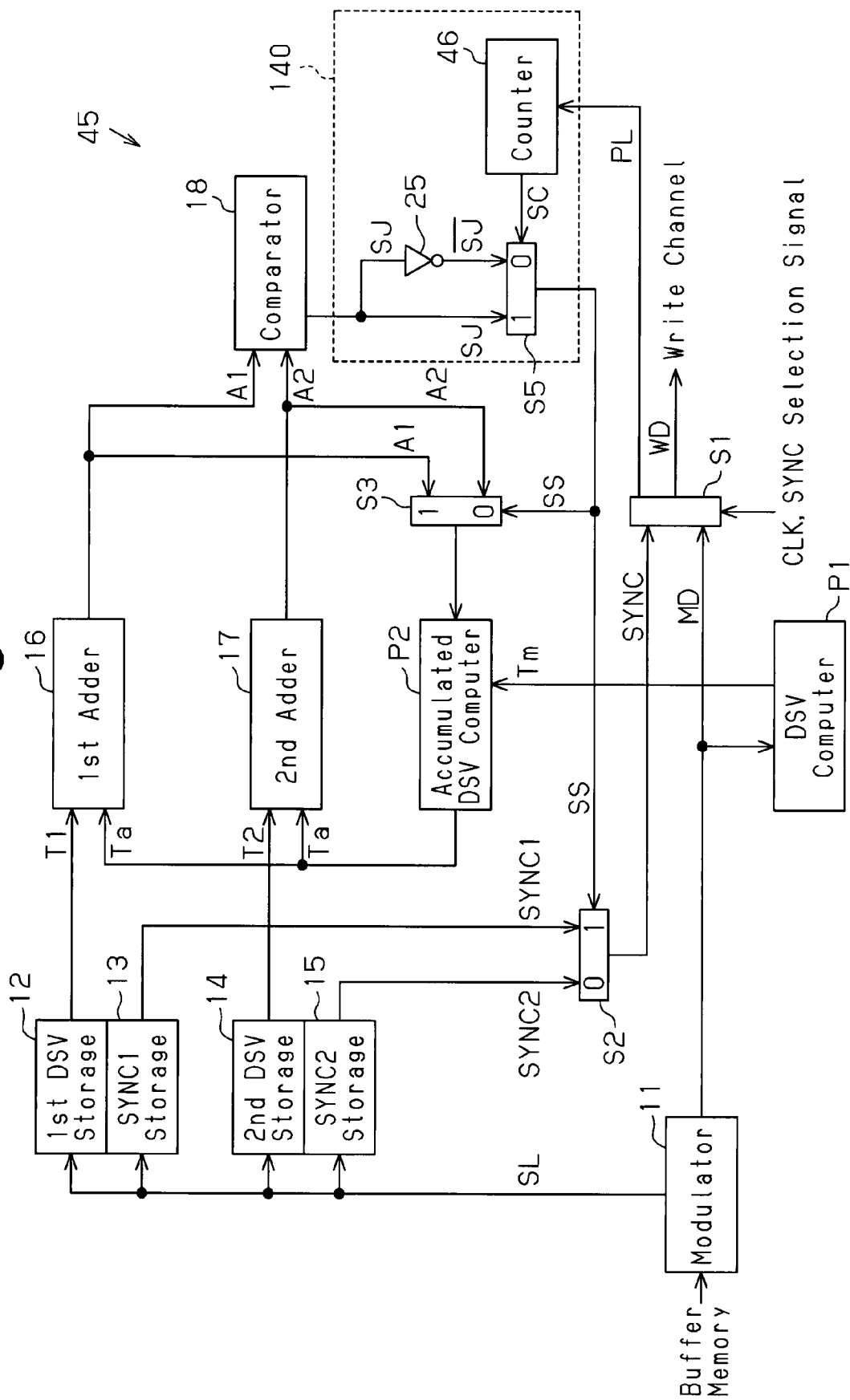
FIG. 13 is a block diagram of a modulation circuit according to still another embodiment of the present invention.

The modulation circuit of the present invention may be a modulation circuit 45, which is shown in FIG. 13. The modulation circuit 45 shown in FIG. 13 inverts the logic value of a determination signal SJ at predetermined timings (every predetermined number of synchronization frames). More specifically, the modulation circuit 45 shown in FIG. 13 includes a counter 46 in lieu of the pseudo random number generation circuit 20 shown in FIG. 11. A NOT circuit 25, a fifth selection circuit S5, and the counter 46 form an inverter 140.

The counter 46 of the modulation circuit 45 shown in FIG. 13 increments its count value sequentially from 0 based on a SYNC pass pulse PL output from the first selection circuit S1 in the same manner as the counter 46 shown in FIG. 10. The counter 46 compares the count value with a predetermined value (e.g., 3) and generates a count determination signal SC based on the comparison result.

More specifically, the counter 46 generates a count determination signal SC having a logic value of "1" when the count value is smaller than the predetermined value of 3 and generates a count determination signal SC having a logic value of "0" when the count value reaches the predetermined value of 3. The counter 46 further resets the count value to 0 when the count value reaches the predetermined value of 3. However, the count value of the counter 46 is not reset even after the recording of data on the DVD-RW is completed once.

When the synchronization frames 1 to 4 are written in one recording process, the modulation circuit 45 selects the synchronization information SYNC of each of the synchronization frames 1 to 3 using the logic value of the determination signal SJ, and selects the synchronization information SYNC of the synchronization frame 4 using the inverted logic value (the logic value of the inverted signal SJ/) of the determination signal SJ. In another case, when the count value is 2 during a second recording of data to the DVD-RW after a first recording of data to the DVD-RW is completed, the synchronization information SYNC of the synchronization frame 2 is selected using the logic value of the inverted signal SJ/ in the second recording process.

The modulation circuit 45 outputs the logic value of the inverted signal SJ/ as the selection signal SS at predetermined timings (every predetermined number of synchronization frames). Further, the count value is not reset after completing the recording of data to the DVD-RW so that the number of synchronization frames selected based on the logic value of the inverted signal SJ/ is changed whenever data is recorded to the DVD-RW. Thus, even when write data is repeatedly generated from the same data that is to be recorded, the same data is prevented from being written at the same position.

The threshold used in the determination circuit 31 (FIG. 9) of the second embodiment may be set to any value. A greater threshold would further effectively prevent the same data from being written at the same position, whereas a smaller threshold would further effectively prevent the accumulated DSV Ta from increasing.

The predetermined value used in the counter 41 (FIG. 10) of the third embodiment may be set in any manner.

The EOR circuit 19 (FIGS. 6 and 9) in the first and second embodiments may be an ENOR circuit.

The structure of the pseudo random number generation circuit 20 (FIG. 6 and FIGS. 9 to 12) in the above embodiments is not limited to the circuit shown in FIG. 8.

In the above embodiments, the data output from the modulation circuits 10, 30, and 40 may be converted into the NRZI format by, for example, the write channel unit 6.

In the above embodiments, data conversion may be performed using the NRZ (non-return to zero) technique method instead of the NRZI technique.

In the above embodiments, the synchronization information SYNC included in each of the synchronization signals SY0 to SY7 is not limited to data having the data length of 14T and may be data having the data length of 13T.

In the above embodiments, the write data may be written to a DVD+RW instead of the DVD-RW.

The present examples and embodiments are to be considered as illustrative and not restrictive, and the invention is not to be limited to the details given herein, but may be modified within the scope and equivalence of the appended claims.

What is claimed is:

1. A device for writing recording data including a plurality of synchronization frames, wherein each of the plurality of synchronization frames includes either one of a primary synchronization signal and a secondary synchronization signal, the device comprising:
   a comparator configured to compare a first accumulated digital sum value for specifying a first recording data including the primary synchronization signal for a synchronization frame with a second accumulated digital sum value for specifying a second recording data including the secondary synchronization signal for the synchronization frame, and generate a first selection signal based on a comparison of the first accumulated digital sum value with the second accumulated digital sum value;
   an inverter configured to invert the first selection signal with respect to each of at least one random number to generate a second selection signal; and
   a selection circuit configured to receive the primary synchronization signal and the secondary synchronization signal, and output either one of the primary synchronization signal and the secondary synchronization signal in response to the second selection signal.

2. The device according to claim 1, wherein the inverter includes:
   a pseudo random number generation circuit for generating a pseudo random number; and
   an inversion circuit, connected to the comparator and the pseudo random number generation circuit, for randomly inverting the first selection signal using the pseudo random number.

3. The device according to claim 1, further comprising:
   a determination circuit, connected to the inverter, for determining whether each of the first accumulated digital sum value and the second accumulated digital sum value is greater than a threshold, and providing the inverter with a digital sum value determination signal indicating the determination,
   wherein the inverter outputs the first selection signal as the second selection signal when at least one of the first and second digital sum values is greater than the threshold.

4. The device according to claim 2, wherein the inversion circuit includes:
   a logic circuit for determining whether the first selection signal and the pseudo random number coincide with each other and generating the second selection signal having a logic value indicating the determination.

5. The device according to claim 4, wherein the logic circuit includes either one of an EOR circuit and an ENOR circuit.

6. The device according to claim 2, wherein the inversion circuit includes:
   an inverted signal generation circuit, connected to the comparator, for inverting the pseudo random number to generate an inverted signal; and
   a selection switch, connected to the comparator, the pseudo random number generation circuit, and the inverted signal generation circuit, for outputting either one of the first selection signal and the inverted signal as the second selection signal in response to the pseudo random number.

7. The device according to claim 2, wherein the inversion circuit includes:
   a counter for incrementing a count value whenever each synchronization frame is written and generating a count determination signal in accordance with the count value; and
   a selection switch, connected to the comparator, the pseudo random number generation circuit, and the counter, for outputting either one of the first selection signal and the pseudo random number as the second selection signal in response to the count determination signal.

8. The device according to claim 7, wherein:
   the counter generates the count determination signal having a first level when the count value is less than a value and generates the count determination signal having a second level when the count value is equal to or greater than the value; and the second selection switch selects the pseudo random number in response to the count determination signal having the first level and selects the first selection signal in response to the count determination signal having the second level.

9. The device according to claim 2, wherein the inversion circuit includes:
an EOR circuit, connected to the comparator and the pseudo random number generation circuit, for randomly inverting the first selection signal using the pseudo random number to generate a random signal; and
a selection switch, connected to the comparator and the EOR circuit, for outputting either one of the first selection signal and the random signal as the second selection signal.

10. The device according to claim 9, wherein the inversion circuit further includes:
a counter for incrementing a count value whenever each synchronization frame is written and generating a count determination signal in accordance with the count value, wherein the selection switch outputs either one of the first selection signal and the random signal as the second selection signal in response to the count determination signal.

11. A device for writing recording data including a plurality of synchronization frames, wherein each of the plurality of synchronization frames includes either one of a primary synchronization signal and a secondary synchronization signal, the device comprising:
a comparator configured to compare a first accumulated digital sum value for specifying a first recording data including the primary synchronization signal for a synchronization frame with a second accumulated digital sum value for specifying a second recording data including the secondary synchronization signal for the synchronization frame, and generate a first selection signal based on a comparison of the first accumulated digital sum value with the second accumulated digital sum value;
an inverter configured to invert the first selection signal for every predetermined number of synchronization frames to generate a second selection signal; and
a selection circuit configured to receive the primary synchronization signal and the secondary synchronization signal, and output either one of the primary synchronization signal and the secondary synchronization signal in response to the second selection signal.

12. The device according to claim 11, wherein the inverter includes:
an inverted signal generation circuit, connected to the comparator, for inverting the pseudo random number to generate an inverted signal;
a selection switch, connected to the comparator, the pseudo random number generation circuit, and the inverted signal generation circuit, for outputting either one of the first selection signal and the inverted signal as the second selection signal in response to the pseudo random number; and
an inversion control unit, connected to the selection switch, for determining the number of times the synchronization frame is written, and generating an inversion control signal based on the determination, wherein the selection switch outputs either one of the first selection signal and the inverted signal as the second selection signal in response to the inversion control signal.

13. The device according to claim 12, wherein the inversion control unit increments a count value whenever each synchronization frame is written and generates a count determination signal in accordance with the count value.

14. A method for writing recording data including a plurality of synchronization frames, wherein each of the plurality of synchronization frames includes either one of a primary synchronization signal and a secondary synchronization signal, the method comprising:
comparing a first accumulated digital sum value for specifying a first recording data including the primary synchronization signal for a synchronization frame with a second accumulated digital sum value for specifying a second recording data including the secondary synchronization signal for the synchronization frame;
generating a result of a comparison of the first accumulated digital sum value with the second accumulated digital sum value;
generating a first selection signal based on the comparison result;
inverting the first selection signal with respect to each of at least one random number to generate a second selection signal; and
outputting either one of the primary synchronization signal and the secondary synchronization signal in response to the second selection signal.

15. The method according to claim 14, wherein said inverting the first selection signal includes:
generating a random number; and
randomly inverting the first selection signal with the random number.

16. The method according to claim 14, wherein said inverting the first selection signal includes:
counting the number of times the synchronization frame is written and generating a count result; and
inverting the first selection signal for every predetermined number of synchronization frames based on the count result.

* * * * *